(12) United States Patent
Rognli et al.

(10) Patent No.: US 7,528,503 B2
(45) Date of Patent: May 5, 2009

(54) LOAD SHEDDING CONTROL FOR CYCLED OR VARIABLE LOAD APPLIANCES

(75) Inventors: Roger Rognli, Otsego, MN (US); Brian Ahlsten, Minneapolis, MN (US)

(73) Assignee: Cannon Technologies, Inc., Golden Valley, MN (US)

( * ) Notice: Subject to any disclaimer, the term of this patent is extended or adjusted under 35 U.S.C. 154(b) by 339 days.

(21) Appl. No.: 11/491,769

(22) Filed: Jul. 24, 2006

(65) Prior Publication Data
US 2007/0021874 A1 Jan. 25, 2007

Related U.S. Application Data

(60) Provisional application No. 60/701,681, filed on Jul. 22, 2005.

(51) Int. Cl.
*H02J 1/10* (2006.01)
(52) U.S. Cl. ........................................ 307/62
(58) Field of Classification Search ............... 307/52, 307/62
See application file for complete search history.

(56) References Cited

U.S. PATENT DOCUMENTS

| | | |
|---|---|---|
| 3,558,911 A | 1/1971 | Chen |
| 3,683,343 A | 8/1972 | Feldman et al. |
| 3,993,984 A | 11/1976 | Penrod |
| D248,838 S | 8/1978 | Pasquarette et al. |
| 4,156,280 A | 5/1979 | Griess |
| 4,190,800 A | 2/1980 | Kelly, Jr. et al. |
| 4,228,511 A | 10/1980 | Simcoe et al. |
| 4,341,345 A | 7/1982 | Hammer et al. |
| 4,345,162 A | 8/1982 | Hammer et al. |
| 4,371,947 A | 2/1983 | Fujisawa |
| 4,389,577 A | 6/1983 | Anderson et al. |
| 4,390,876 A | 6/1983 | Bjorklund et al. |
| D270,815 S | 10/1983 | Odom |
| 4,415,943 A | 11/1983 | Wortman |

(Continued)

FOREIGN PATENT DOCUMENTS

EP 00 593 225 4/1997

(Continued)

OTHER PUBLICATIONS

U.S. Appl. No. 11/811,144, filed Jun. 8, 2007, Ockert et al.

(Continued)

*Primary Examiner*—Robert L. Deberadinis
(74) *Attorney, Agent, or Firm*—Patterson, Thuente, Skaar & Christensen, P.A.

(57) ABSTRACT

Control of a variable output appliance of a small energy consumer participating in an electrical load shedding program. A baseline operating characteristic of the appliance is determined for ordinary operation (such as in an absence of any load shedding requirements). An amount by which to reduce output of the appliance is determined in accordance with the load shedding program. Operation of the appliance is controlled to achieve the output reduction in accordance with the load shedding. This approach enables providing incentive for the small energy consumer to participate in the load shedding program, the incentive being based on the amount by which output is reduced, thereby representing a reduction of actual energy consumption for that small energy consumer.

21 Claims, 5 Drawing Sheets

U.S. PATENT DOCUMENTS

| | | |
|---|---|---|
| 4,464,724 A | 8/1984 | Gurr et al. |
| 4,551,812 A | 11/1985 | Gurr et al. |
| 4,583,090 A | 4/1986 | Eden et al. |
| 4,620,283 A | 10/1986 | Butt et al. |
| 4,635,214 A | 1/1987 | Kasai et al. |
| 4,657,179 A | 4/1987 | Aggers et al. |
| 4,672,501 A | 6/1987 | Bilac et al. |
| 4,708,910 A | 11/1987 | Forss |
| 4,780,910 A | 10/1988 | Huddleston et al. |
| 4,804,938 A | 2/1989 | Rouse et al. |
| 4,819,180 A | 4/1989 | Hedman et al. |
| 4,902,964 A | 2/1990 | Szabela et al. |
| 5,099,348 A | 3/1992 | Huddleston et al. |
| 5,197,668 A | 3/1993 | Ratz et al. |
| 5,203,497 A | 4/1993 | Ratz et al. |
| 5,218,552 A | 6/1993 | Stirk et al. |
| 5,319,296 A | 6/1994 | Patel |
| 5,414,640 A | 5/1995 | Seem |
| 5,426,620 A | 6/1995 | Budney |
| 5,462,225 A | 10/1995 | Massara et al. |
| 5,502,339 A | 3/1996 | Hartig |
| 5,519,622 A | 5/1996 | Chasek |
| 5,576,700 A | 11/1996 | Davis et al. |
| 5,619,121 A | 4/1997 | Trainor |
| 5,640,153 A | 6/1997 | Hildebrand et al. |
| 5,675,503 A | 10/1997 | Moe et al. |
| 5,687,139 A | 11/1997 | Budney |
| 5,696,695 A | 12/1997 | Ehlers et al. |
| 5,761,083 A | 6/1998 | Brown, Jr. et al. |
| 5,936,817 A | 8/1999 | Matsko et al. |
| 6,029,092 A | 2/2000 | Stein |
| 6,098,893 A | 8/2000 | Berglund et al. |
| 6,157,874 A | 12/2000 | Cooley et al. |
| 6,167,389 A | 12/2000 | Davis et al. |
| 6,181,985 B1 | 1/2001 | O'Donnell et al. |
| 6,208,905 B1 | 3/2001 | Giddings et al. |
| 6,254,009 B1 | 7/2001 | Proffitt et al. |
| 6,264,110 B1 | 7/2001 | Proffitt et al. |
| 6,305,611 B1 | 10/2001 | Proffitt et al. |
| 6,314,378 B1 | 11/2001 | Hodge et al. |
| 6,356,426 B1 | 3/2002 | Dougherty |
| 6,377,874 B1 | 4/2002 | Ykema |
| 6,480,803 B1 | 11/2002 | Pierret et al. |
| 6,496,342 B1 | 12/2002 | Horvath |
| 6,509,841 B1 | 1/2003 | Colton et al. |
| 6,512,966 B2 | 1/2003 | Lof et al. |
| 6,519,509 B1 | 2/2003 | Nierlich et al. |
| 6,574,581 B1 | 6/2003 | Bohrer et al. |
| 6,622,926 B1 | 9/2003 | Sartain et al. |
| 6,634,566 B2 | 10/2003 | Archacki, Jr. et al. |
| 6,671,586 B2 | 12/2003 | Davis et al. |
| 6,681,154 B2 | 1/2004 | Nierlich et al. |
| 6,745,106 B2 | 6/2004 | Howard et al. |
| 6,747,571 B2 | 6/2004 | Fierro et al. |
| 6,789,739 B2 | 9/2004 | Rosen |
| 6,806,446 B1 | 10/2004 | Neale |
| 6,816,350 B1 | 11/2004 | Hoopes |
| 6,828,695 B1 | 12/2004 | Hansen |
| 6,891,478 B2 | 5/2005 | Gardner |
| 6,975,926 B2 | 12/2005 | Schanin |
| 6,975,958 B2 | 12/2005 | Bohrer et al. |
| 7,010,363 B2 | 3/2006 | Donnelly et al. |
| 7,136,725 B1 | 11/2006 | Paciorek et al. |
| 7,163,158 B2 | 1/2007 | Rossi et al. |
| 7,172,132 B2 | 2/2007 | Proffitt et al. |
| 7,216,015 B2 | 5/2007 | Poth |
| 7,222,111 B1 | 5/2007 | Budike, Jr. |
| 7,242,114 B1 | 7/2007 | Cannon et al. |
| 7,292,114 B2 | 11/2007 | Greenberg |
| 7,346,467 B2 | 3/2008 | Bohrer et al. |
| 7,355,301 B2 | 4/2008 | Ockert et al. |
| 2002/0087234 A1 | 7/2002 | Lof et al. |
| 2002/0103655 A1 | 8/2002 | Boies et al. |
| 2002/0138176 A1 | 9/2002 | Davis et al. |
| 2003/0150925 A1 | 8/2003 | Archacki, Jr. et al. |
| 2003/0158632 A1 | 8/2003 | Nierlich et al. |
| 2004/0255601 A1 | 12/2004 | Kwon et al. |
| 2005/0097905 A1 | 5/2005 | Kwon et al. |
| 2005/0143865 A1 | 6/2005 | Gardner |
| 2006/0036349 A1 | 2/2006 | Kates |
| 2006/0036350 A1 | 2/2006 | Bohrer et al. |
| 2006/0283964 A1 | 12/2006 | Garozzo |
| 2006/0283965 A1 | 12/2006 | Mueller et al. |
| 2007/0021874 A1 | 1/2007 | Rognli et al. |
| 2008/0133065 A1 | 6/2008 | Cannon et al. |

FOREIGN PATENT DOCUMENTS

| | | |
|---|---|---|
| WO | WO 01/52478 | 7/2001 |

OTHER PUBLICATIONS

U.S. Appl. No. 11/978,933, filed Oct. 30, 2007, Cannon.
U.S. Appl. No. 10/922,120, filed Aug. 19, 2007, Cannon et al.
Honeywell International, Inc. and Cannon Technologies, Inc., ExpressCom LCR, 2002, www.honeywellcannon.com, 4 pages.
Product Bulletin ESPT-2., Cannon Technologies, Inc., *ExpressStat Programmable Demand Response Thereostat*, 2002, 2 pages.
Marketing Brochure, Canon Technologies, Inc., *Load Response Center*, 2003, 2 pages.
Marketing Brochure, Canon Technologies, Inc., *Cannon Distribution Automation Systems*, 2003, 1 page.
Marketing Brochure, Cannon Technologies, Inc., *Cannon 900 MHz Flex™ Paging Load Control Receiver*, 1999/2000, 4 pages.
Marketing Brochure, Cannon Technologies, Inc., *YUKON™ Software for Advanced Energy Services*, 2002, 12 pages.
Marketing Brochure, Cannon Technologies, Inc., *YUKON™ Energy Information Aggregation curtailment Control for Your Largest Customers*, 2002, website www.readmeter.com, 4 pages.
Marketing Brochure, Cannon Technologies, Inc., *YUKON™ Look how easy we've made load control*, 2002,www.loadcontrol.com, 4 pages.
Marketing Brochure, Cannon Technologies, Inc., *YUKON™ Intelligent Monitoring and Notification*, 2003, www.esubstation.com, 6 pages.

**Advanced Magnitude Control
Control Loop Diagram and Calculations**

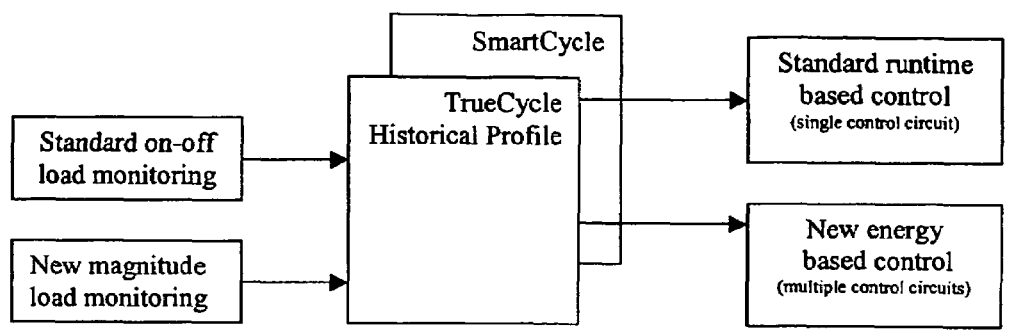

Magnitude Load Monitoring

Since load (energy) is proportional to the current for a constant voltage, and since the milliamp reading from a CT is proportional to the current through the line it is measuring, then the ma output of the CT can be used as a proxy for load.

$m_t$ = Instantaneous (half second) milliamp reading from CT
$m_a$ = Sum of the $m_t$ / 7200 for the hour (average of $m_t$ for the hour)

$M_m$ = Maximum historical average ma reading for 5 consecutive minutes $M_p = m_a / M_m$ = the value stored in the TrueCycle or SmartCycle tables

Energy Based Control

$C_p$ = Control rate of controlled hour calculated by TrueCycle or SmartCycle
$L_t$ = Load (ma) target for control = $C_p * M_m$ $L_{k1}$ = Maximum average 5 minute ma reading when only K1 closed.
$L_{k12}$ = Maximum average 5 minute ma reading when only K1 and K2 closed.
$L_{k2} = L_{k12} - L_{k1}$ LCR needs to learn these $L_k$ values over control time When control called
  If $L_{k1}$ = 0, close K1 for the first period and monitor... see below
    LCR make K1, (interrupt K2 and K3) and monitor $m_t$
      If $m_t$ = 0, keep monitoring
  If $L_t <= L_{k1}$, close K1 for $L_t / L_{k1}$ percent of the period ...monitor
    But do not allow K1 to be open less than 3 minutes to prevent short cycle
  If $L_t > L_{k1}$, close K1 for the period, close K2 for $(L_t - L_{k1})/(L_{k12} - L_{k1})$ When monitoring during a control time, the goal is to make that period's $m_a$ equal to the $L_t$. The method involves running the fewest number of compressors at the longest, or most continuous time to make this possible.

*Fig. 5*

LOAD SHEDDING CONTROL FOR CYCLED OR VARIABLE LOAD APPLIANCES

RELATED APPLICATION

The present application claims priority to U.S. Provisional Application No. 60/701,681, filed Jul. 22, 2005, and entitled "ENERGY BASED CONTROL SYSTEM AND METHOD FOR A COOLING SYSTEM," which is incorporated by reference herein in its entirety.

FIELD OF THE INVENTION

The present invention is related to electrical power distribution and, more particularly, to a load shedding control arrangement for appliances such as air conditioners that permits fair, or uniform, load shedding, and commensurate crediting of load shedding program participants therefor.

BACKGROUND OF THE INVENTION

Conservation and efficiency are important aspects of modem large scale energy distribution systems. Likewise, effective control of load on the power grid is essential to prevent brownouts or spikes in energy costs. When a local utility is unable to meet its local demand, the utility seeks to buy excess capacity from other utilities. Because most of the U.S. and some parts of the rest of North America are connected to the same energy grid, it is not uncommon for utilities in metropolitan areas to buy electricity from utilities in more rural areas. On exceptionally hot summer days, the cost per megawatt-hour of electricity can soar as utilities compete with each other to meet the surge in demand as a result of air conditioners.

When faced with high load demand on the grid, electricity suppliers often offer economic incentives to larger energy consumers, such as factories, manufacturing facilities, and large corporate complexes, to reduce their consumption. The reduction of normal power loads is often referred to as power shedding or load shedding. As customers shed their loads, the demand on the grid reduces, which in turn helps control the demand for and volatility of the costs of electricity.

As part of the load shedding arrangements for energy consumers, different systems for controlling and/or monitoring energy consumption have been developed. For example, in U.S. Patent Application Publication No. 2005/0143865, Gardner teaches a system and method that accepts commands from the local utility company causing controlled devices, such as air conditioner compressors, to reduce consumption for settable periods of time, such as the peak demand period on hot summer afternoons.

Typically, utility companies negotiate predefined load shedding arrangements with large commercial or industrial consumers who have relatively predictable consumption patterns. A large factory or office complex is more likely to have a generally predictable power consumption pattern on a day to day basis, and therefore the potential energy savings are also more predictable. Larger energy consumers tend to have larger equipment that can justify more expensive and elaborate monitoring and control systems.

Unfortunately, the load shedding arrangements developed for these larger energy consumers are not generally applicable when it comes to estimating a predictable power consumption pattern for small commercial or residential consumers. Small commercial and residential energy consumers are defined herein as energy consumers having spaces that are cooled by one or more units with capacities of less than 20 tons. Unlike larger energy consumers, smaller consumers have less predictable energy demands. In addition, as a whole, smaller energy consumers utilize a great diversity of types of equipment having different efficiencies and operating modes, as well as being oversized to the cooling space by varying degrees. Furthermore, the sheer number of small energy consumers presents a substantial challenge in administering a load shedding program, including equipping each piece of equipment for load control at reasonable cost, and issuing credits or other incentive to the energy consumers for participation in the load shedding program in a fair, or uniform, manner.

Several attempts to provide load shedding capabilities to small consumers have been proposed, including the Gardner system mentioned above. In U.S. Pat. No. 6,891,478, Gardner also teaches a system of control devices that individually monitor and control energy consumption of individual appliances, including the air conditioning system, wherein the control is dictated in part based on local utility load shedding requirements. In U.S. Patent Application Publication No. 2006/0036349, Kates teaches a system whereby the local utility may send commands to cooling appliances, such as air conditioners, refrigerators, and freezers; the system, having been calibrated to the individual appliance's optimal performance characteristics, causes the cooling appliances to efficiently reduce power consumption to help meet load shedding requirements. In U.S. Pat. No. 5,675,503, Moe teaches a system that uses historical performance data for a controlled device, such as an air conditioner, to determine how best to cycle the device to meet the load shedding demands communicated by the a local utility while maintaining an indoor temperature within an acceptable range.

Typically, a load shedding arrangement for small energy consumers facilitates remotely controlling the operation of air conditioning units, which are generally the largest single energy consuming appliances within a home or small business. These cooling systems generally include the main components of an evaporator, a condenser, and a compressor. The compressor receives low pressure gaseous working fluid from the evaporator and delivers it as a gas to the condenser. The standard method of cycling cooling systems (air conditioners) for utility demand relief is to switch them off for some percentage of the time. Typically, they are cycled off 50% or 15 minutes out of every half hour. If the cooling system is cycled off more than its normal cycling would have had the compressor off, demand relief results. It is this demand relief that utilities desire when they control the load. If the control is too high of a percentage, the home heats up too fast, and residents become uncomfortable and go off the program that enables the demand relief. If the control is at too low of a percentage, no demand reduction is realized. The optimum cycle percentage is dependent on the degree to which a cooling system is oversized to the cooling load.

More advanced cycling techniques have been implemented with TRUECYCLE® and SMARTCYCLE®. These are advanced cycling techniques that monitor the control circuit of the cooling system, and can adjust the operation pattern of the compressor based on forecast runtime. The load control receiver (LCR) knows when the compressor is running and so can over time develop a runtime profile, or over-sizing factor, for the home/compressor combination. TRUECYCLE® and SMARTCYLE® are examples of commercialized approaches for assessing this over-sizing. Once the LCR learns the over-sizing, it uses this information to adjust control times. For example, a 50% TRUECYCLE® on a compressor that would have run for 80% of an hour, because it is oversized for that hour, will be have load shedding of 60% of the hour (the 20% that it was going to be off plus 50% of the 80% it was going to run).

TRUECYCLE® runtime cycle control is a method of increasing the yield of cycled cooling control by adjusting the controlling cycle time on an individual cooling system basis. The control device typically makes this adjustment based on compressor runtime data collected the hour prior to the start of the control period, applying the cycle rate to this runtime instead of clock time. TRUECYCLE® works well for a single speed compressor, where the load is either on or off. But dual speed, dual stage (such as those found on commercial rooftop units), multi-speed, or variable speed compressors can be on at different rates of energy consumption. Thus, knowing just on or off for this type of system is not sufficient to allow one to know the over-sizing. As such, there is a need for a new technique to assess the over-sizing in these types of cooling systems.

Additionally, a problem unique to expanding load shedding arrangements to small energy consumers is the problem of accounting for the savings gained by the load shedding and accurately crediting these savings to the end consumer. Previously disclosed systems for controlling power consumption by small energy consumers approach this problem by ensuring the loads are kept below a pre-determined or broadcasted level. In U.S. Pat. No. 6,806,446, Neale teaches a system that controls the overall power consumption of a building by measuring and recording the power drawn by various appliances, including the air conditioner, and using this historical data to decide whether appliances can be turned on based on the available power. In U.S. Pat. No. 6,975,926, Schanin teaches a system for using the historical performance of a cooling system to control its performance such that the cooling output is held within an acceptable temperature range while providing a reduction in power consumption during the controlled time period.

These previously disclosed systems and methods have several common characteristics. They use historical performance data to help control cooling systems such that power consumption limitations may be observed during specified periods of time. None allow for the utility company to actively monitor compliance with broadcasted load shedding requirements, nor do they allow for any accounting of such compliance. Further, with previously disclosed systems, a utility is unable to differentiate between those consumers who have the ability to provide more shedding than others. An effective solution to these problems that would permit utilities to take advantage of the large potential for load shedding represented by the small energy consumers in such a way as to equitably account for the imposition of the load shedding obligations would be desirable.

SUMMARY OF THE INVENTION

One aspect of the invention is directed to controlling a cyclically-operating appliance of a small energy consumer participating in an electrical load shedding program. An indicator of actual power consumed by the appliance during a plurality of output variations or cycles is monitored. Based on the monitoring, the following may be computed:

(a) a level of maximum power consumed by the appliance during at least one period of full output; and
(b) an overall level of power consumed by the appliance over the plurality of output variations or cycles.

From this computation, a baseline characteristic of actual energy consumption of the appliance can be determined, for example, as a ratio of the overall power level to the maximum power level, or as an amount of energy or power (over time) being consumed. An amount by which to reduce output of the appliance in accordance with the load shedding program is determined as a percentage of the baseline characteristic of actual energy consumption. Alternatively, a target energy reduction in output can be expressed as a power level in terms of kilowatts, for example. These approaches enable providing an incentive for the small energy consumer based on the amount by which output is reduced such that the amount is representative of a reduction of actual energy consumption for that consumer.

According to another aspect of the invention, an electrical load shedding program can be fairly administered among a plurality of small energy consumers that each operate a variable or cycled output appliance subject to load shedding. For each appliance, an indicator of actual power consumed by the appliance during a plurality of output variations or cycles is monitored. Based on this monitoring a level of maximum power consumed by the appliance during at least one period of full output, and an overall level of power consumed by the appliance over the plurality of output variations or cycles can be determined. A baseline characteristic of actual energy consumption of the appliance is then determined based on a ratio of the overall power level to the maximum power level.

An amount by which to reduce output of each appliance in accordance with the load shedding program is determined as either a percentage of the baseline characteristic of actual energy consumption for that appliance, or an amount of power by which consumption is to be reduced. In the case of the reduction expressed as a percentage, the percentage is substantially the same for all appliances of the different small consumers participating in the load shedding program. If the reduction is in terms of a power amount, the amount is preferably the same for all appliances of the different small consumers participating in the load shedding program. The small energy consumer can receive incentive for the amount by which output is reduced such that the amount is representative of a reduction of actual energy consumption for that consumer.

Another aspect of the invention is directed to controlling a variable output appliance of a small energy consumer participating in an electrical load shedding program. An amount by which to reduce output of the appliance in accordance with the load shedding program is determined. This amount can be a ratio relative to the baseline characteristic, or a power consumption magnitude representing a power consumption reduction target.

Operation of the appliance is controlled to achieve the output reduction in accordance with the load shedding. The control preferentially operates the appliance at a reduced output for longer durations to reduce a cycling frequency. An incentive can be provided for the small consumer based on the amount by which output is reduced such that the amount is representative of a reduction of actual energy consumption for that small consumer.

Another aspect of the invention includes a method of controlling a cyclically-operating or variable load appliance of a small energy consumer participating in an electrical load shedding program. A load control receiver (LCR) is configured at the appliance such that the LCR is able to monitor and control operation of the appliance. The LCR is operated to receive a load reduction criterion that defines compliance with the load shedding program in terms of energy use, to monitor an indicator of actual power consumed by the appliance, and to adjust operation of the appliance to satisfy the load reduction criterion. Based on the monitored actual power, the LCR indicates an amount of load reduction that was achieved in terms of energy use. An incentive can be provided for the small energy consumer based on the amount of load reduction such that the amount is representative of a reduction of actual energy consumption for that small energy consumer.

A system for administering an electrical load shedding program for a plurality of small energy consumers that run cyclically-operating or variable load air conditioners according to another aspect of the invention includes a load control receiver (LCR). A LCR is configured at each of the air conditioners, and includes a power sensing arrangement, a communications sub-system, and a controller. The power sensing arrangement monitors current draw by at least one compressor of each air conditioner. The communications sub-system receives load reduction criteria from a utility provider, load reduction criteria defining compliance with the load shedding program in terms of energy use. The controller supplies output signaling for selectively operating the at least one compressor based on the current draw and on the load reduction criteria. The controller is also configured to adjust an operation regime of the at least one compressor to produce an energy consumption profile that is in compliance with the load reduction criterion.

BRIEF DESCRIPTION OF THE DRAWINGS

FIG. 5 is a diagram and pseudo code illustrating one exemplary control arrangement for controlling energy consumption of a multi-stage condenser unit.

Figure 1:
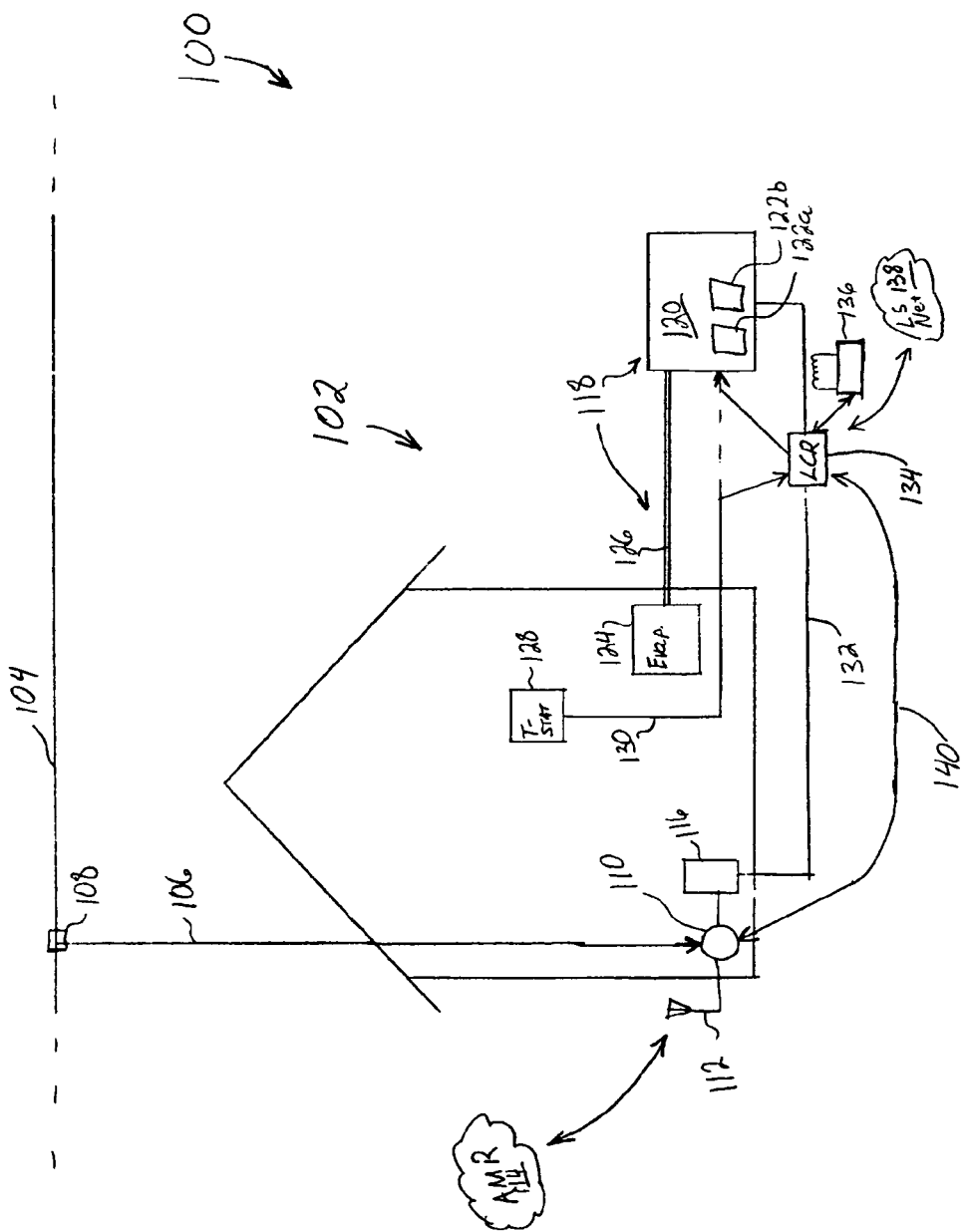
FIG. 1 is a diagram illustrating a load shedding system arrangement installed at an example residential or small energy consumer's site according to one aspect of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE PREFERED EMBODIMENTS

The needs described above are in large part met by the load shedding control system and method of the present invention. One aspect of the present invention is directed to reducing the energy consumption of an appliance such as an air conditioner based on its actual consumption pattern. In one embodiment, the operation of the appliance is adjusted such that the energy consumed by the appliance is reduced by an amount that is a percentage of the overall energy that would have been consumed in the absence of the load shedding. This embodiment can be applied to single stage, dual stage, multi-stage, and variable speed compressor units.

FIG. 1 is a diagram illustrating an exemplary portion 100 of a load shedding system that is installed at an residence 102 (which exemplifies a residential or small commercial space). An electrical utility provider (not shown) supplies AC power via overhead or underground distribution lines 104, and residential drop 106 via transformer 108. The AC power enters the home through power meter 110, which may be communicatively interfaced via antenna 112 to automatic meter reading (AMR) system 114. The power is then divided up among various home circuits at breaker box 116.

Residence 102 includes air conditioner 118 that comprises an outdoor condenser 120 that can have one or more compressor pumps such as compressors 122a and 122b, and an indoor evaporator unit 124. Coolant lines 126 complete the cooling circuit between the condenser 120 and evaporator 124. Thermostat 128 controls operation of air conditioner 118 via control line 130. Depending on the type of compressors and their arrangement, the thermostatic control can provide various degrees of control For example, the thermostatic control can control on/off switching of condenser unit 120, can selectively on/off switch individual compressors 122a and 122b in condenser 120, or can control the speed at which variable-speed compressors should be driven. Power to the compressor generally comes directly from breaker box 116, as indicated at 132.

According to one aspect of the invention, a load control system is installed at residence 102 for selectively controlling operation of one or more appliances to comply with certain power use limits, such as part of a load shedding program. According to one embodiment, as depicted in FIG. 1, load the control system includes load control receiver (LCR) 134. In one embodiment, load control receiver 134 includes subsystems for: (a) sensing power usage by condenser 120; (b) controlling operation of condenser 120 to comply with load shedding requirements; and (c) communicating with the utility provider to receive load control commands and to send back information about power usage at residence 102.

In one embodiment, power use sensing is accomplished through real-time current measurement. For example, a current transformer or set of current transformers 136 is configured to detect current draw by condenser 120 or by each individual compressor therein. In one embodiment, the sensed current magnitudes are provided to an analog-to-digital circuit in LCR 134 which, in turn, samples the output of current transformers 136 and converts the samples into a data stream representing the real-time loading occurring in the air conditioner. In one embodiment, the sampling rate is twice per second. The sampling rate may be adjusted considerably, as appropriate, to accommodate the type of operating mode of the air conditioner (or other appliance). Thus, for example, a compressor with a variable speed control that is constantly subject to control signals may need to have its power sampled more frequently than an on/off cycling regime.

In a related embodiment, LCR 134 includes a set of at least one control output that can control operation of condenser 120 to some extent. In one embodiment, the at least one control output is a set of relays that on/off cycle one or more compressors in condenser 120. In another embodiment, the at least one control output is a signal output that controls or commands a separate controller circuit (not shown in FIG. 1) that can be a part of air conditioner system 118. For example, in the case of a variable-speed compressor, the separate controller circuit would be variable frequency the motor drive for the compressor. In this example, the variable speed motor drive may accept analog or digital control signals to command operation of the motor drive output.

Persons skilled in the relevant arts will appreciate that a wide range of control configurations that permit LCR 134 to control operation of condenser 120 to some extent are within the spirit and scope of the invention. One type of control configuration can override thermostatic control 130 entirely. Another possible control configuration can work cooperatively with thermostatic control 130, wherein the thermostat output is monitored, and in response to the thermostat output, the condenser is operated to provide cooling requested by the thermostat (to the extent that it is compliant with any applicable load shedding rules). Tracking the thermostatic control and trying to execute it takes into account the homeowner's temperature preferences.

In various embodiment, LCR 134 has a suitable variety of communications sub-systems for facilitating the load shedding program. In one example embodiment, LCR 134 has specialized communications circuitry for communicating with the utility provider via a specialized load shedding network 138. Load shedding network 138 can be a dedicated communication channel for the load shedding program, or can be part of another communication system. Additionally, load shedding network can utilize any suitable medium, including, for example, wireless communications, telephonic communications, Internet Protocol-based communications, power line-based communications, satellite system-based communications, and the like. In a related embodiment, LCR 134 includes circuitry and software for communicatively interfacing with electrical meter 110. In this embodiment, LCR 134 can use AMR system 114 for communicating with the utility provider via meter 112.

One aspect of the present invention provides the utility with load shedding control to minimize the cycling needed to account for over-sizing. The installation and maintenance costs may be reduced by limiting monitoring activities to only the compressor, which is the largest single consumer of energy in the typical residence. Additionally, the compressor and the power meter are typically external to the residence, and installation of the system can occur regardless of whether the consumer is at home. Wear and tear of the compressors may also be reduced as a result of the embodiments described below. Further, aspects of the present invention permit the utility company to properly account for over-sized air conditioners by examining the load that is actually shed, and will allow utilities to allocate load shedding incentives (such as credits, discounts, prizes, and the like) based on the actual amount of energy sacrificed by the consumer in the load shedding program.

By turning off the air conditioners or reducing on-time, significant energy savings may result at the expense of only slightly warmer indoor temperatures. In particular, many load shedding arrangements cycle air conditioners. Simply cycling air conditioners on and off, however, is not necessarily the best approach. If an air conditioner has more than one compressor, it may have a low power mode in which only one compressor is working. Likewise, a compressor may have more than one speed, which would allow the compressor to enter a slower speed to reduce power consumption. Straight cycling of air conditioners often makes it more difficult to extract the humidity from the indoor air. Frequent cycling of air conditioners can also damage the air compressors. Air conditioners are typically more efficient when they are run continuously or at longer intervals, since a significant amount of energy is consumed at the start of each cycle before the air conditioner begins producing its cooling effect.

Simple cycling also ignores the over-sizing of the compressors for the cooling loads. As a rule of thumb, many home building contractors add 20% air conditioning capacity to the calculated capacity, so as to prevent the homeowner from later complaining if the house isn't cool enough. Therefore, many home air conditioners are oversized. Air conditioners that are oversized already tend to cycle on and off to maintain desired cooling levels. If load shedding requires additional cycling, then the cycling will likely cause additional stress on the compressors, leading to shorter life or higher maintenance costs. Also, if an over-sized air conditioner is already cycled off for 50% of the time, then requiring loads to go to a 50% cycle rate will result in very little or no load reduction, since the air conditioner is already in compliance. Certainly, the utility company will want to avoid giving credits to consumers who do nothing at all. Also, to this end, utilities would prefer to provide incentives that are a function of actual energy surrendered by the customers. Thus, the load shedding program would be applied fairly and uniformly for all customers, regardless of the differences among air conditioning units.

Figure 2:
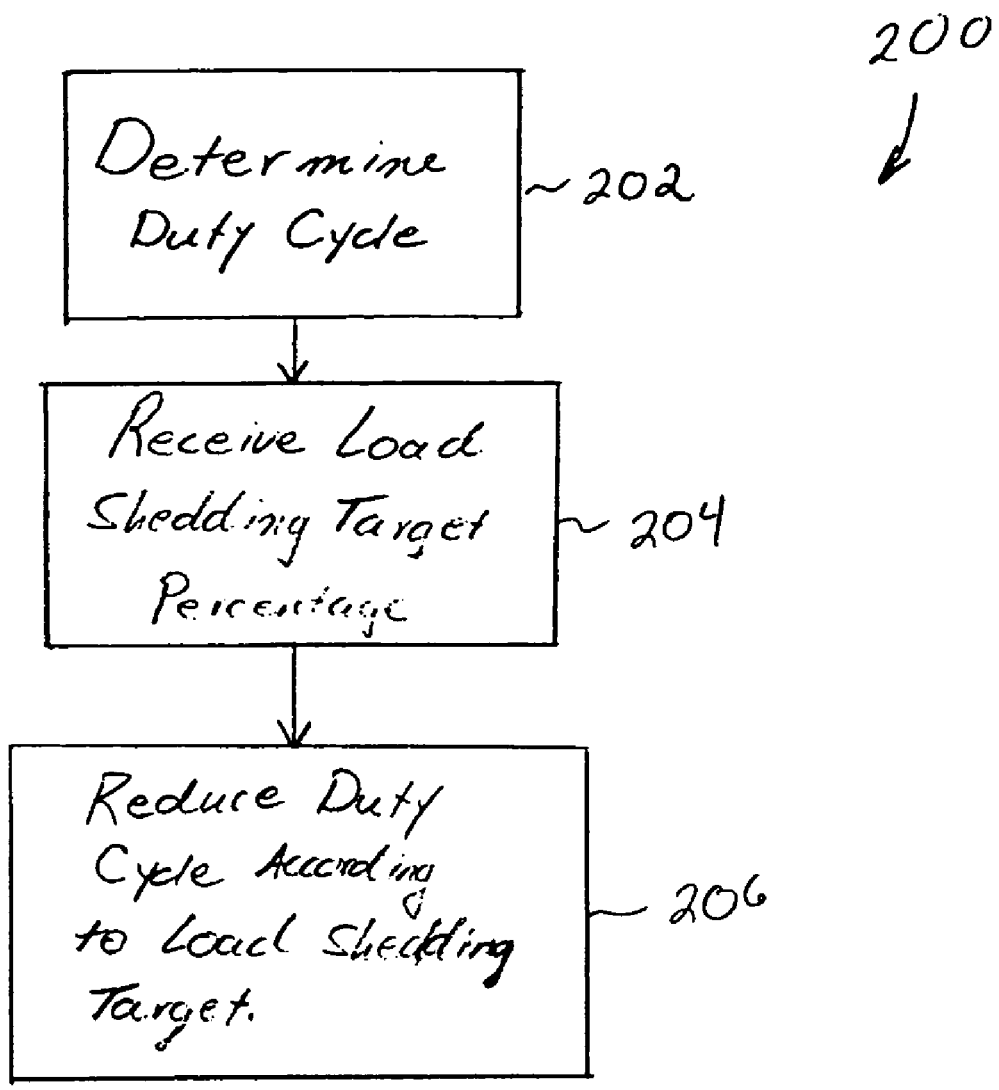
FIG. 2 is a flow diagram illustrating high-level method of conducting load shedding according to one type of embodiment.

According to one aspect of the invention, the load shedding control is a function of the energy actually being consumed. FIG. 2 is a basic flow diagram illustrating one example embodiment of a process 200 of energy-based load shedding control. At step 202, the load control system determines the duty cycle of the air conditioner over a monitoring time period that includes two or more cycles or other variations of output. As used herein, the duty cycle represents the power that is actually being consumed as a ratio or percentage of power associated with full output. Thus, duty cycle can be considered as representing a baseline characteristic of actual energy consumption. In the case of an on/off cycled compressor, the duty cycle is the ratio of ON time to total time. In the case of a variable speed compressor, the duty cycle is the ratio of the power being consumed during the monitoring period to the power associated with running the compressor at full speed. Similarly, in the case of a condenser unit with multiple compressors, the duty cycle is the ratio of power actually being consumed over the monitoring period to the power consumed at full output (i.e. when all compressors are running at full speed).

Figure 3A:
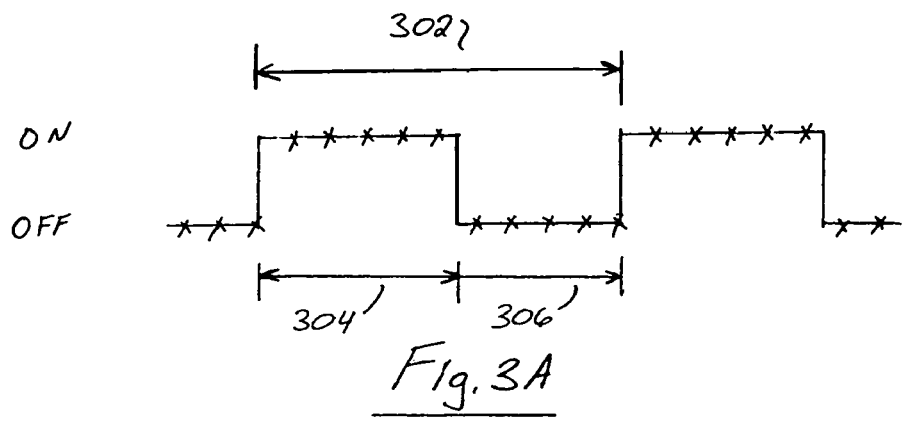
FIGS. 3A-3C are graphs illustrating various types of operation modes for air conditioner compressors that may be subject to load shedding rules.
Figure 3B:
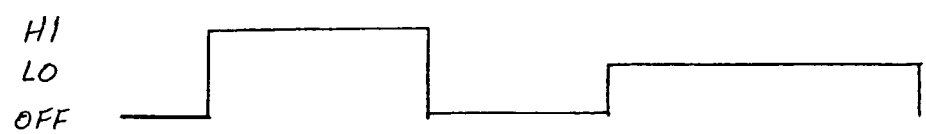
Figure 3C:

FIGS. 3A-3C illustrate various examples of operating modes of a condenser unit. Each graph represents a measurement representing the power dissipated by the condenser unit over time. As described above, the power can be determined by measuring the input current into the condenser. In FIG. 3A, a condenser operates in simple on/off cycling. Time interval 302 represents one single complete cycle. Time interval 304 is the ON time; whereas time interval 306 is the OFF time. The X marks indicate points along the operation curve that can be sampled for the purpose of computing the duty cycle. As illustrated in FIG. 3A, the duty cycle is slightly greater than ½ or 50%. FIG. 3B illustrates a condenser that operates at three output levels, HI, LO, and OFF. This type of condenser may be implemented as a single condenser unit with two compressors. FIG. 3C illustrates an example operation of a variable speed compressor. Output settings for this compressor include FULL ON, OFF, and a number of intermediate points in between. The granularity of the intermediate output levels may be discrete, as illustrated, or continuous (which could produce a smooth curve).

Figure 4:
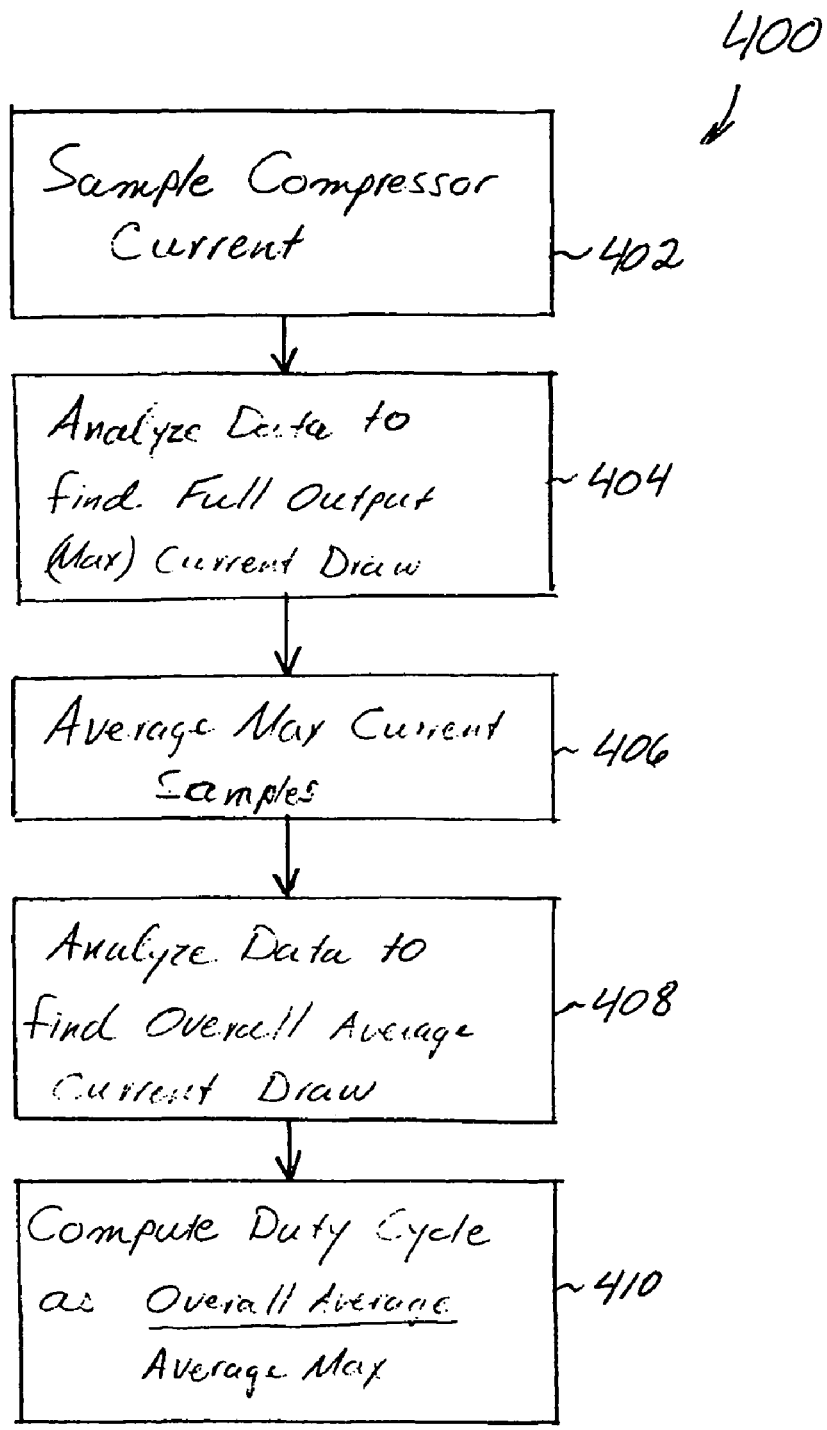
FIG. 4 is a flow diagram illustrating a method of computing a duty cycle, or baseline energy consumption characteristic of an appliance subject to load shedding rules.

FIG. 4 illustrates an exemplary process 400 of determining a duty cycle value for a given condenser unit. At step 402, the input current is measured, sampled, and digitized for subsequent computational analysis. At step 404, the maximum, or full output current draw is determined. Full output is not a maximum point, but rather an average of samples during what is determined to be an interval of sustained full output (such as for a 5-minute duration). This averaging, performed at step 406, is essentially time integration that de-sensitizes the measurement to short-duration current spikes (such as those caused by motor starting current), which would otherwise misrepresent the actual full output energy. In one embodiment, a filter function is applied in conjunction with the averaging function. One example of a suitable filter function is a first order infinite impulse response (IIR) filter with a time constant of 9-12. A variety of suitable data analysis techniques that are known in the art may be applied to find the maximum sustained power interval from among other intervals of less than full power consumption.

At step 408, the complete set of data for the monitoring period is averaged, or otherwise analyzed, to find the overall current draw for the period. At step 410, the duty cycle is computed as the overall (e.g., average) current draw divided by the previously-determined maximum sustained current draw. It will be appreciated by persons of ordinary skill in the relevant arts that the computations of averages is only one example of the types of computations that can produce an integrative result. Clearly, other statistical or other analytical methods (such as the filtering described above) may be used alternatively, or in combination with the integrative analyses within the spirit and scope of the invention.

In an alternative embodiment, instead of measuring actual duty cycling from current measurements, the LCR monitors the thermostat output signal. In this approach, the thermostat is not necessarily directly coupled to the condenser as it would normally be in the absence of the load shedding configuration. Rather, the thermostat is suggesting to the LCR how to control the condenser. The LCR may or may not follow the thermostat's output, depending on the need to comply with load shedding rules. Thus, if there is a need to reduce power consumption by 40%, for example, the LCR would receive and process the thermostat output as an indicator of the amount of air conditioning output that the homeowner or occupants are demanding. The LCR could use this information to tune the operation of the air conditioner to provide the 40% energy reduction while providing, to the extent possible, the desired comfort level inside the home. This approach permits bypassing the steps of collecting information to obtain the actual power levels over the monitoring duration. The thermostat output, alone, provides the duty cycling information.

Referring again to FIG. 2, at step 204, the LCR receives or retrieves from memory previously-received load shedding target information. In one embodiment, this information represents an amount (in terms of a ratio or percentage of actual energy being consumed) by which the energy consumption should be reduced. For example, the load shedding target can be 15%, or 3/20. Equivalently, the target can be a ratio or percentage to which the power consumption should be reduced, such as 85% of nominal. In another embodiment, the load shedding target information is an amount of power (e.g. in kilowatts) by which the load represented by the appliance should be reduced.

At step 205, the LCR implements the load shedding instructions to produce the desired energy savings. A wide range of adjustments can be performed to achieve the target reduction. For example, in one embodiment, the duty cycle of an on/off cycled condenser unit is adjusted by shortening the ON duration. In a related embodiment, instead of shortening the ON duration, the OFF duration may be lengthened. In a similar embodiment, the ON duration and OFF duration are both lengthened by unequal percentages to achieve the desired change in the duty cycle. By lengthening the ON duration, this approach effectively increases the overshoot amount of cooling. Thus, the air in the home is used to buffer extra cooling that can keep the occupants comfortable during the extended OFF duration of the load shedding period. Note that this extra cooling is provided while the condenser is operating at a relatively efficient portion of the cycle (i.e. not at the start of the cycle). Hence, this approach reduces the number of starts and, ultimately, the amount of energy spent operating at lower efficiency.

In another embodiment, where the condenser has a plurality of individual compressors, the LCR can adjust the ON and OFF time durations for each compressor. Additionally, the LCR can selectively operate different combinations of compressors to achieve the best efficiency. For example, the LCR can be programmed to preferentially operate the fewest number of compressors for the longest period of time in compliance with the load shedding instructions.

In an alternative embodiment, the LCR monitors the condenser power draw, but does not control the condenser power directly. Rather, the LCR communicates with the thermostat to adjust the temperature, or hysteresis configuration to achieve the desired duty cycle. In a simple form of this embodiment, the LCR responds to an ON command from the thermostat by delaying the actual on command to the compressor for some time. Likewise, the OFF command can be delayed by (preferably a lesser) time duration. The time durations can be dynamically adjustable based on a determination of the thermostat-requested duty cycling.

FIG. 5 is a diagram and pseudo code illustrating one example of an energy-based magnitude control scheme according to one embodiment. In this example, the control scheme can utilize portions of the existing SMARTCYCLE® and TRUECYCLE® techniques and equipment. As illustrated in the diagram, the SMARTCYCLE® and TRUECYCLE® controls can accommodate embodiments of the new magnitude load monitoring and energy based control of the present invention in addition to the standard on-off load monitoring and the standard runtime-based control.

The power dissipation is monitored as described above for each of three compressors by current transformers CT. The average power consumption $M_p$, computed substantially as described above, is fed to the SMARTCYCLE® or TRUECYCLE® process. The output of SMARTCYCLE® or TRUECYCLE® is a time-based control rate. The energy based control according to this embodiment is achieved as presented in the pseudo code. Here, K1, K2, and K3 represent relay switches for on/off cycling each individual compressor. By monitoring and controlling the individual compressors, the overall load target $L_t$ can be achieved with high efficiency by running the fewest number of compressors for the longest, most continuous time.

The present invention may be embodied in other specific forms without departing from the spirit of the essential attributes thereof; therefore, the illustrated embodiments should be considered in all respects as illustrative and not restrictive, reference being made to the appended claims rather than to the foregoing description to indicate the scope of the invention.

What is claimed is:

1. A method of controlling a cyclically-operating appliance of a small energy consumer participating in an electrical load shedding program, the method comprising:
monitoring an indicator of actual power consumed by the appliance during a plurality of output variations or cycles;
based on the monitoring, computing: (a) a level of maximum power consumed by the appliance during at least one period of full output, and (b) an overall level of power consumed by the appliance over the plurality of output variations or cycles;
determining a baseline characteristic of actual energy consumption of the appliance;

operating the appliance according to a new operating regime that produces a target reduction in energy output in accordance with the load shedding program; and providing an incentive for the small energy consumer based on the amount by which output is reduced such that the amount is representative of a reduction of actual energy consumption for that small energy consumer.

2. The method of claim 1, wherein the step of monitoring the indicator of actual power consumed includes monitoring the amount of current drawn by the appliance.

3. The method of claim 1, wherein the step of monitoring the indicator of actual power consumed includes sampling the indicator at intervals that are much shorter than a period of output variation or cycling.

4. The method of claim 1, wherein the step of computing the level of maximum power includes averaging a plurality of samples of the monitored power indicator taken during a period of sustained output.

5. The method of claim 1, wherein the step of computing the level of maximum power includes integrating a plurality of samples of the monitored power indicator taken during a plurality of periods of sustained output, and determining which of the periods corresponds to the full output.

6. The method of claim 1, wherein the step of computing the overall level of power includes integrating a plurality of samples of the monitored power indicator taken during a period of output varying or cycling.

7. The method of claim 1, wherein the step of determining the baseline characteristic of actual energy consumption includes representing the baseline characteristic in terms of a ratio or percentage of full output.

8. The method of claim 1, wherein the appliance is an air conditioning system having at least one compressor, and wherein the step of monitoring the indicator of actual power consumed by the air conditioning system includes measuring a current draw of only the at least one compressor.

9. The method of claim 1, wherein the step of determining the baseline characteristic of energy consumption of the appliance is based on a ratio of the overall power level to the maximum power level; and wherein the step of operating the appliance according to the new operating regime in accordance with the load shedding program includes determining an amount by which to reduce output of the appliance in accordance with the load shedding program in terms of a percentage of the baseline characteristic of actual energy consumption, and controlling the appliance to reduce its output accordingly.

10. The method of claim 1, wherein the step of determining the baseline characteristic of energy consumption of the appliance produces a level of power consumption by the appliance; and wherein the step of operating the appliance according to the new operating regime in accordance with the load shedding program includes determining a target limit of power consumption to be achieved, and controlling the appliance to meet the target level.

11. A method of fairly administering an electrical load shedding program among a plurality small energy consumers that each operate a variable or cycled output appliance that is subject to load shedding, the method comprising:

for each appliance:
monitoring an indicator of actual power consumed by the appliance during a plurality of output variations or cycles;
based on the monitoring, computing: (a) a level of maximum power consumed by the appliance during at least one period of full output, and (b) an overall level of power consumed by the appliance over the plurality of output variations or cycles;
determining a baseline characteristic of actual energy consumption of the appliance based on a ratio of the overall power level to the maximum power level;
determining an amount by which to reduce output of each appliance in accordance with the load shedding program, wherein the amount is defined as either:
(a) a percentage of the baseline characteristic of actual energy consumption for that appliance, wherein the percentage is substantially the same for all appliances participating in the load shedding program; or
(b) an amount of power by which consumption is to be reduced, wherein the amount of power is s substantially the same for all appliances participating in the load shedding program; and
providing incentive to the small energy consumer for the amount by which output is reduced such that the amount is representative of a reduction of actual energy consumption for that small energy consumer.

12. A method of controlling a variable output appliance of a small energy consumer participating in an electrical load shedding program, the method comprising:

determining a baseline operating characteristic of the appliance that would exist in an absence of any load shedding requirements;
determining an amount by which to reduce output of the appliance in accordance with the load shedding program;
controlling operation of the appliance to achieve the output reduction in accordance with the load shedding, wherein the controlling preferentially operates the appliance at a reduced output for longer durations to reduce a cycling frequency; and
providing an incentive for the small energy consumer based on the amount by which output is reduced such that the amount is representative of a reduction of actual energy consumption for that small energy consumer.

13. The method of claim 12, wherein the step of determining the amount by which to reduce the output of the appliance produces a value of a type selected from the group consisting of: a ratio relative to the baseline characteristic, and a power consumption magnitude representing a power consumption reduction target.

14. The method of claim 12, wherein the step of determining the amount by which to reduce the output of the appliance produces the amount in terms of a ratio relative to the baseline characteristic.

15. The method of claim 12, wherein the step of determining the baseline operating characteristic includes making measurements of an indicator of actual power consumption of the appliance.

16. The method of claim 12, wherein the step of determining the baseline operating characteristic includes monitoring an appliance control signal.

17. A method of controlling a cyclically-operating or variable load appliance of a small energy consumer participating in an electrical load shedding program, the method comprising:

configuring a load control receiver (LCR) at the appliance such that the LCR is able to monitor and control operation of the appliance;
operating the LCR to:
receive a load reduction criterion that defines compliance with the load shedding program in terms of energy use;

monitor an indicator of actual power consumed by the appliance;

adjust operation of the appliance to satisfy the load reduction criterion; and based on the monitored actual power, indicate an amount of load reduction achieved in terms of energy use; and providing an incentive for the small energy consumer based on the amount of load reduction such that the amount is representative of a reduction of actual energy consumption for that small energy consumer.

18. The method of 17, wherein the step of receiving the load reduction criterion includes receiving at least one energy use variable selected from the group consisting of: an amount of energy reduction over a defined time duration, a power consumption level integrated over a defined time duration, and a ratio of power consumption relative to a maximum output of the appliance.

19. A system for administering an electrical load shedding program for a plurality of small energy consumers that run cyclically-operating or variable load air conditioners, the system comprising:

a load control receiver (LCR) configured at each of the air conditioners, wherein each LCR includes:

a power sensing arrangement that monitors current draw by at least one compressor of each air conditioner;

a communications sub-system that receives load reduction criteria from a utility provider, the load reduction criteria defining compliance with the load shedding program in terms of energy use; and a controller that supplies output signaling for selectively operating the at least one compressor based on the current draw and on the load reduction criteria, wherein the controller is configured to adjust an operation regime of the at least one compressor to produce an energy consumption profile that is in compliance with the load reduction criterion.

20. The system of claim 19, wherein the power sensing arrangement includes at least one current transformer coupled to at least one power conductor of the at least one compressor.

21. The system of claim 19, wherein the communication sub-system power sensing arrangement includes at least one current transformer coupled to at least one power conductor of the at least one compressor.

* * * * *